United States Patent [19]
Paul et al.

[11] Patent Number: 5,293,787
[45] Date of Patent: Mar. 15, 1994

[54] ROTORS HAVING A COMBINED FUNCTION OF PROVIDING A VARIABLE RELUCTANCE MAGNETIC PATH AND AN AXIAL THRUST BEARING SURFACE

[75] Inventors: Surendar Paul, Laurinburg, N.C.; Charles Allen, Rochester Hills, Mich.

[73] Assignee: Rockwell International Corporation, Pittsburgh, Pa.

[21] Appl. No.: 909,474

[22] Filed: Jul. 6, 1992

[51] Int. Cl.⁵ .................... G05G 1/00; F16C 32/00
[52] U.S. Cl. .......................... 74/572; 384/448
[58] Field of Search ............... 74/572, 573 R, 574; 384/448, 446; 324/174

[56] References Cited

U.S. PATENT DOCUMENTS

| | | | |
|---|---|---|---|
| 3,476,454 | 11/1969 | Markey | 384/446 |
| 4,092,053 | 5/1978 | Reigler et al. | 384/448 |
| 4,875,785 | 10/1989 | Santos et al. | 384/446 X |
| 4,884,901 | 12/1989 | Harsdorff | 384/448 |
| 4,978,234 | 12/1990 | Ouchi | 384/448 |
| 5,011,302 | 4/1991 | Mott et al. | 384/448 |
| 5,018,393 | 5/1991 | Seegers | 384/448 X |
| 5,052,827 | 10/1991 | Huiskamp et al. | 384/448 |
| 5,085,519 | 2/1992 | Dougherty | 384/446 X |
| 5,103,170 | 4/1992 | Grillo et al. | 384/448 X |
| 5,129,741 | 7/1992 | Deane | 384/448 |

FOREIGN PATENT DOCUMENTS 1157218 5/1958 France ..................... 384/448

Primary Examiner—Vinh T. Loung

[57] ABSTRACT

A rotor for use in speed sensing a transmission output shaft including circumferentially alternating teeth and voids which offers a variable reluctance flux path upon relative rotation thereof with respect to a fixed sensor. The rotor also includes an inward radially extending shoulder which is trapped between the yoke and a tapered roller bearing which also provides a surface over which the axial thrust required to trap the rotor may be distributed for application to a tapered roller bearing. Increasing the surface area of contact between the rotor and bearing minimizes premature bearing failures.

3 Claims, 2 Drawing Sheets

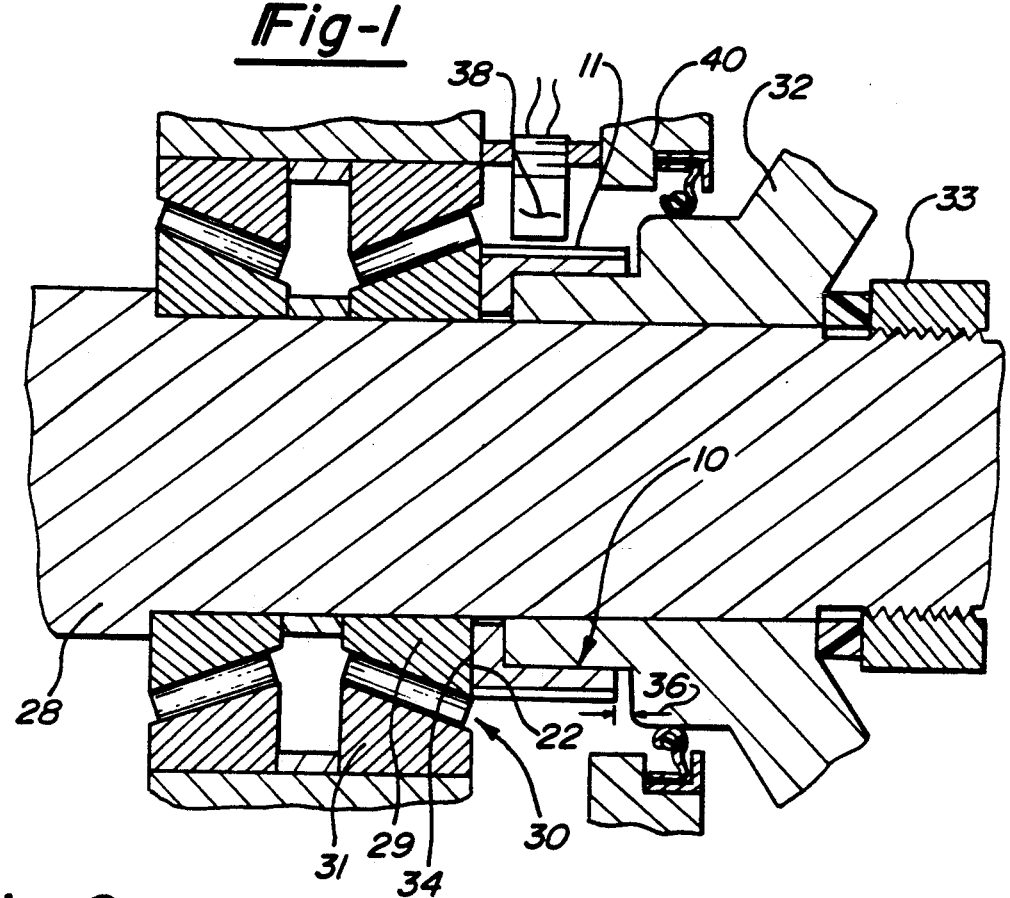
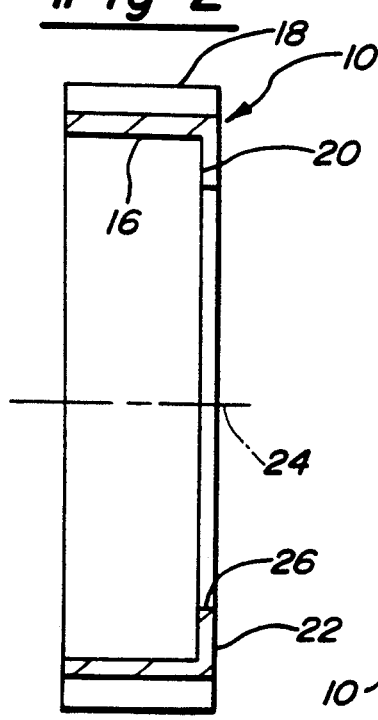
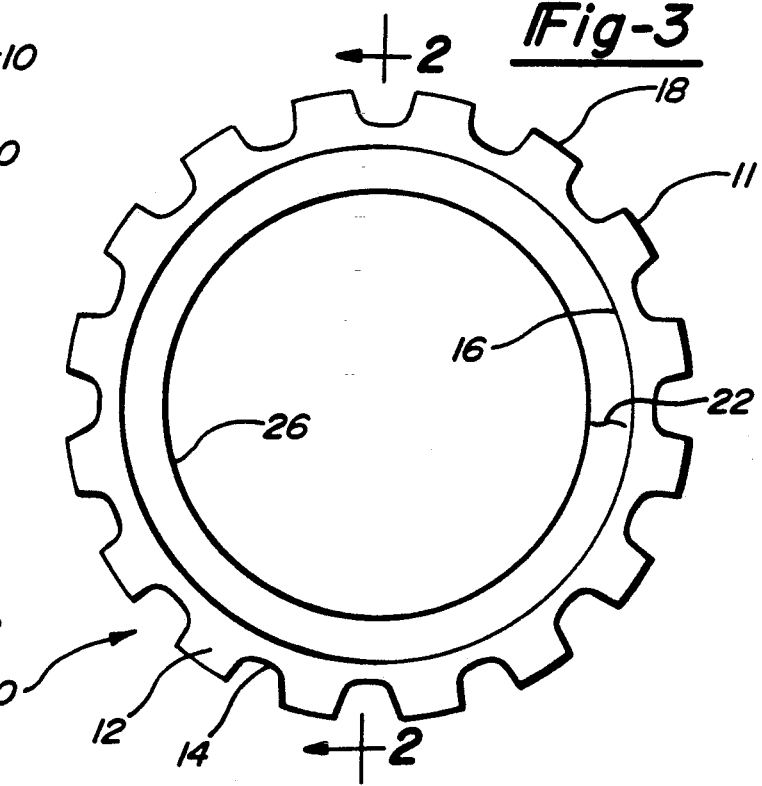

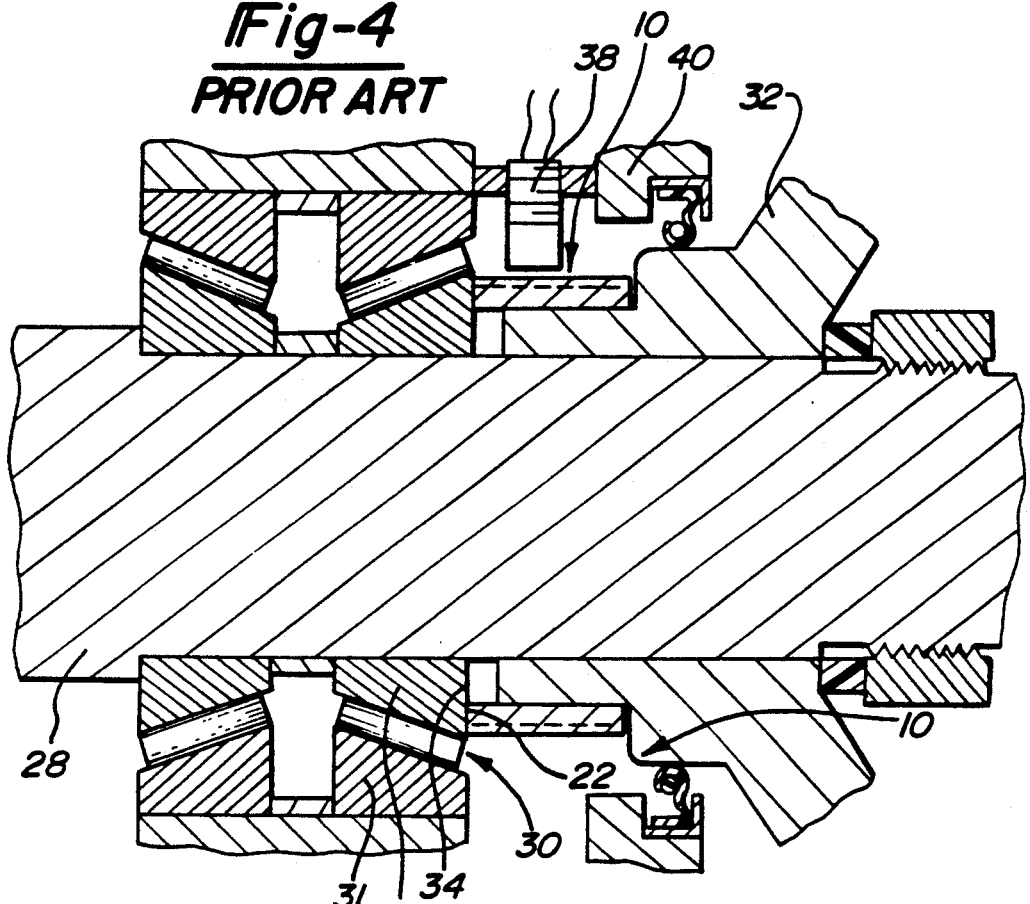
Fig-4 PRIOR ART
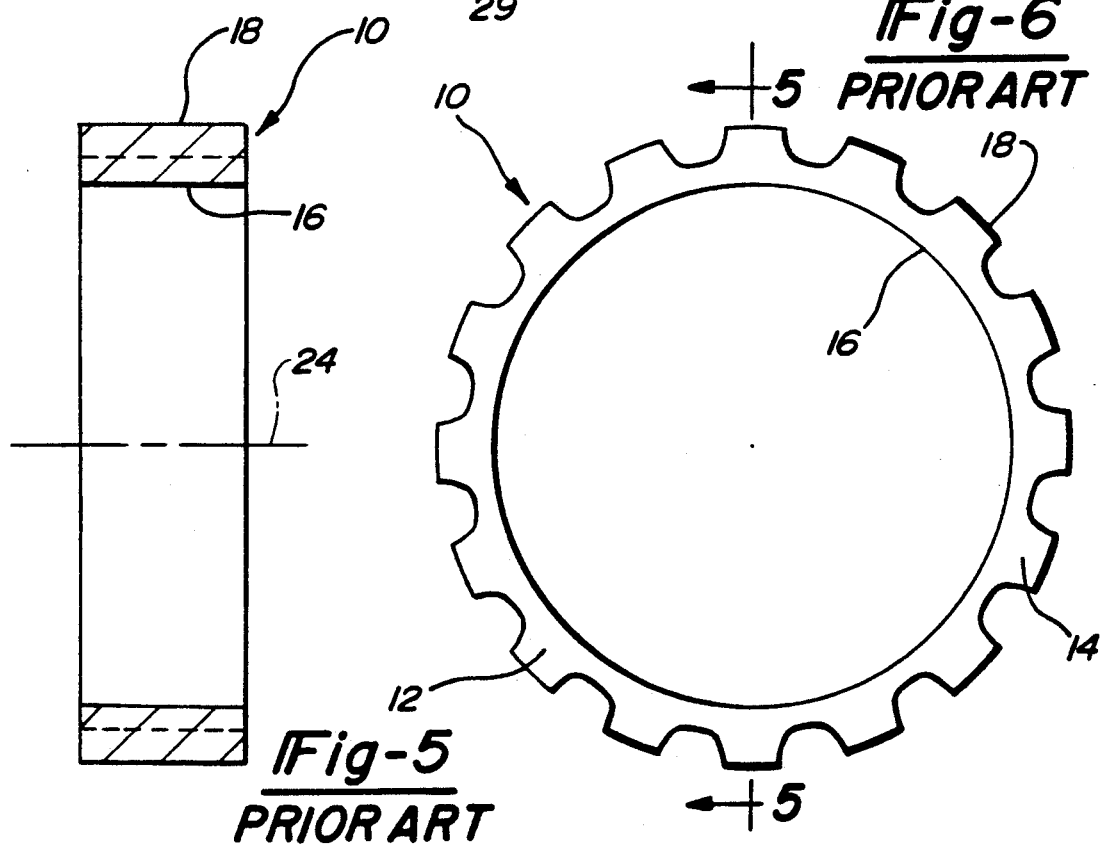
Fig-5 PRIOR ART
Fig-6 PRIOR ART

ROTORS HAVING A COMBINED FUNCTION OF PROVIDING A VARIABLE RELUCTANCE MAGNETIC PATH AND AN AXIAL THRUST BEARING SURFACE

BACKGROUND OF THE INVENTION

1. Field of the Invention

The present invention relates to rotors for use in speed sensing and, more specifically, to rotors having a combined function of providing a variable reluctance magnetic path and an axial thrust bearing surface.

2. Description of the Related Art

Output shafts of transmissions are bearingly supported by pairs of tapered roller bearings disposed in a support member of the transmission case. An output yoke is press fitted on the output shaft to drivingly connect with a drive shaft. A speed sensing rotor is trapped between the yoke and the bearing, thereby driving the rotor with the yoke and bearing. The rotor is secured to an axially extending flange of shorter length in such a manner that the rotor extends beyond same to contact a radially extending surface of the tapered roller bearing. In this manner, a force is imposed on the bearing which causes a moment to be imposed on the bearing at a location radially displaced from the output shaft which imparts an unanticipated thrust force leading to premature bearing failure.

It is an object of the present invention to provide a combined speed sensing rotor and a radially extending thrust bearing surface.

SUMMARY OF THE PRESENT INVENTION

The present invention incorporates a rotor for use in speed sensing a transmission output shaft including circumferentially alternating teeth and voids which provides a variable reluctance flux path upon relative rotation thereof with respect to a fixed sensor. The rotor also includes an inward radially extending shoulder which is trapped between the yoke and a tapered roller bearing which also provides a surface over which the axial thrust required to trap the rotor may be distributed for application to a tapered roller bearing. Increasing the surface area of contact between the rotor and bearing minimizes premature bearing failures.

The preferred embodiment incorporates a transmission including an output shaft supported in a transmission case by a pair of axially spaced tapered roller bearings drivingly engaged to a driveline yoke by means of an interference fit achieved as a result of respectively interfitting tapers and maintained in engagement therewith by force transmitted via a retainer nut. The present invention includes a rotor having an axially extending circumferential portion continuously connected to a radially extending portion having a central opening defined therein disposed coaxial to said circumferential portion. The circumferential portion includes alternating regions of magnetic permeability. The rotor is drivingly connected to the output shaft for relative rotation therewith by means of physical engagement between the yoke and the inner race of the tapered roller bearing.

These and other aspects of the present invention will become more readily apparent by reference to the following detailed description of the embodiments as shown in the drawings.

BRIEF DESCRIPTION OF THE DRAWINGS

FIG. 1 is a cross-sectional view of a transmission output shaft incorporating the rotor of the present invention;

FIG. 2 is a cross-section of the rotor of the present invention;

FIG. 3 is a plan view of the rotor of the present invention;

FIG. 4 is a cross-sectional view of a transmission incorporating an output shaft and drive yoke incorporating the prior art rotor;

FIG. 5 is a cross-sectional view of the prior art rotor; and

FIG. 6 is a plan view of the prior art rotor.

DETAILED DESCRIPTION OF THE PREFERRED EMBODIMENT

The preferred embodiment of the present invention includes a rotor 10 as shown in FIGS. 1, 2 and 3 having a generally circular configuration including circumferential axially extending sections having material removed therefrom by a hobbing process defining teeth 12 and gaps 14. Teeth 12 and gaps 14 define alternating regions of magnetic permeability. The radially extending surface portion 22 is perpendicular to the axis 24 of bore 16 therein defining a central opening. Bore 26 is concentric with bore 16 as well as outer peripheral surface 18. Rotor 10 may be constructed using a powdered metal process from any ferrous material. Rotor 10 may be installed about output shaft 28 so as to abut inner race 29 of tapered roller bearing 30. Yoke 32 may then be press fitted over output shaft 28 and retained thereon by retainer nut 33 so as to maintain abutment of radial surface 22 and radial surface 34 of tapered roller bearing 30. Clearance 36 thus provides for any tolerance stack that may occur in the manufacturing process. Sensor 38 installed in transmission case 40 detects variations in the reluctance of the flux path and produces a sinusoidal output signal in response to variations in the magnetic gap between sensor 38 and rotor 10.

Alternatively, the rotor may be prepared by a combined rolling and stamping process. First the general shape is produced by a draw die to form a cup-like structure featuring an axially extending circumferential portion connected to a radially inward extending central portion. A third manufacturing method is maching from a solid bar stock.

The prior art is illustrated in FIGS. 4, 5 and 6 including a rotor 10 having a generally circular configuration including sections having material removed therefrom by a hobbing process defining teeth 12 and gaps 14. The bore 16 is generally concentric with outer peripheral surface 18. Rotor 10 may be constructed by a powdered metal process from any ferrous material or, in the alternative, it may be machined from a solid bar stock. Rotor 10 may be installed on the output shaft 28 so as to abut the outward radial surface of inner race 29. Yoke 32 may then be press fitted over output shaft 28 so as to maintain abutment of radial surface 22 and radial surface 34 of tapered roller bearing 30. Sensor 38 installed in transmission case 40 detects variations in the reluctance of the flux path and produces a sinusoidal output signal in response to variations in the magnetic gap between sensor 38 and rotor 10. The radial outward engagement of portions 22 and 34 result in a force input to inner race 29 which may cause premature failure of bearing 30.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. In combination with a transmission including an output shaft, a pair of axially spaced tapered roller bearings drivingly engaged to a drive line yoke by means of an interference fit achieved as a result of respectively interfitting tapers and maintained in engagement therewith by force transmitted via a retainer nut; an apparatus comprising:
   - a rotor including a circumferential axially extending portion continuously connected to a radially extending portion having a central opening defined therein disposed coaxial to said circumferential portion, said circumferential portion having alternating regions of magnetic permeability;
   - said rotor drivingly connected to said output shaft for relative rotation therewith by means of physical retention between said yoke and an inner race of a tapered roller bearing;
   - said rotor defines a central axially extending cylindrical portion which is telescopically reviewed by a corresponding portion of said yoke; and
   - said central opening corresponds in relative size with the diameter of said output shaft so as to telescopically receive said rotor and initially define a center position appropriate for subsequently reviewing said yoke.

2. The invention of claim 1 wherein said rotor defines a face which extends from said output shaft radially outwardly to define substantially parallel to a mating face defined by an inner race of said tapered roller bearings.

3. A transmission including an output shaft, a pair of axially spaced tapered roller bearings drivingly engaged to a drive line yoke by means of an interference fit achieved as a result of respectively interfitting tapers and maintained in engagement therewith by force transmitted via a retainer nut; further comprising:
   - a rotor including a circumferential axially extending portion continuously connected to a radially extending portion;
   - said radially extending portion defining a face oriented perpendicular to the axis of said circumferential portion and an opening coaxial to said circumferential portion, said opening corresponding in relative size with the diameter of said output shaft and defining a centered relationship for said rotor, said face defining a plane parallel with a respective face formed on the inner race of an outer tapered roller bearing; and
   - said rotor further defining a central axially extending cylindrical portion which is telescopically received by a corresponding portion of said yoke so that said rotor is drivingly connected to said output shaft for relative rotation therewith by means of physical engagement between said yoke and an inner race of said tapered roller bearing.

* * * * *